US010262239B2

(12) United States Patent
Polak et al.

(10) Patent No.: US 10,262,239 B2
(45) Date of Patent: Apr. 16, 2019

(54) VIDEO CONTENT CONTEXTUAL CLASSIFICATION (71) Applicant: Viisights Solutions Ltd., Tel-Aviv (IL)

(72) Inventors: Simon Polak, Tel-Aviv (IL); Menashe Rothschild, Tel-Aviv (IL); Asaf Birenzvieg, Hod-HaSharon (IL)

(73) Assignee: Viisights Solutions Ltd., Tel-Aviv (IL)

( * ) Notice: Subject to any disclaimer, the term of this patent is extended or adjusted under 35 U.S.C. 154(b) by 0 days.

(21) Appl. No.: 15/652,367

(22) Filed: Jul. 18, 2017

(65) Prior Publication Data
US 2018/0032845 A1 Feb. 1, 2018

Related U.S. Application Data (60) Provisional application No. 62/366,658, filed on Jul. 26, 2016.

(51) Int. Cl.
*G06K 9/00* (2006.01)
*G06K 9/62* (2006.01)
*G06K 9/46* (2006.01)
*G06K 9/72* (2006.01)

(52) U.S. Cl.
CPC ....... *G06K 9/6269* (2013.01); *G06K 9/00718* (2013.01); *G06K 9/4604* (2013.01); *G06K 9/726* (2013.01)

(58) Field of Classification Search
CPC ............. G06K 9/6269; G06K 9/00718; G06K 9/4604; G06K 9/726; G06K 9/00765; G06K 9/6267; G06K 9/00771; G06K 9/00684
See application file for complete search history.

(56) References Cited

U.S. PATENT DOCUMENTS 6,909,745 B1 * 6/2005 Puri .................. H04N 19/70
348/384.1
9,946,933 B2 * 4/2018 De Souza .......... G06K 9/00718
(Continued)

OTHER PUBLICATIONS

Brandt et al. "Fast Frame-Based Scene Change Detection in the Compressed Domain for MPEG-4 Video", The Second International Conference on Next Generation Mobile Applications, Services and Technologies, 2008, NGMAST '08, Cardiff, GB, Sep. 16-19, 2008, p. 514-520, Sep. 2008.

(Continued)

*Primary Examiner* — Ali Bayat (57) ABSTRACT

A computer implemented method of semantically categorizing a video stream through multimodal content classification, comprising dividing a designated video stream to a plurality of scenes by analyzing a visual content of a plurality of frames of the video stream to identify scene changes between consecutive scenes, applying a plurality of classification functions to each of a plurality of modalities extracted from each of the scenes to calculate a class probability for each of a plurality of known concepts detected in each scene, applying a plurality of multimodal classification functions on the class probability of the known concepts to calculate a scene category probability for each scene indicating a probability of the scene to be categorized in one or more semantic categories and categorizing the video stream to a stream category of the semantic categories by aggregating the category probability of the scenes.

15 Claims, 5 Drawing Sheets (56) References Cited

U.S. PATENT DOCUMENTS

| | | | | |
|---|---|---|---|---|
| 2005/0238238 | A1* | 10/2005 | Xu .................... | G06F 17/30787 382/224 |
| 2007/0070069 | A1* | 3/2007 | Samarasekera ......... | G06F 3/011 345/427 |
| 2009/0208106 | A1* | 8/2009 | Dunlop .............. | G06K 9/00664 382/173 |
| 2017/0270363 | A1 | 9/2017 | Polak et al. | |

OTHER PUBLICATIONS

Chen et al. "Video Scene Change Detection Method Using Unsupervised Segmentation and Object Tracking", IEEE International Conference on Multimedia and EXPO, ICME 2001, Tokyo, Japan, Aug. 22-25, 2001, p. 56-59, Aug. 2001.

Jiang et al. "Scene Change Detection for Video Database Management Systems—A Survey", Department of Computer Science, Purdue University, Purdue e-Pubs, Computer Science Technical Reports, Report No. 96-058, p. 1-28, Oct. 1996.

Shalev-Shwartz et al. "On the Sample Complexity of End-to-End Training Vs. Semantic Abstraction Training", ArXiv Preprint ArXiv: 1604.06915-1-1604.06915-4, Apr. 23, 2016.

\* cited by examiner

VIDEO CONTENT CONTEXTUAL CLASSIFICATION

REFERENCES APPLICATIONS

Materials incorporated by reference in this invention include the following:

U.S. Provisional Patent Application No. 62/310,885 entitled "SCENE CHANGE DETECTION AND LOGGING" filed on Mar. 21, 2016, the contents of which are incorporated herein by reference in their entirety.

REFERENCES CITED

"On the Sample Complexity of End-to-end Training vs. Semantic Abstraction Training" by Shai Shalev-Shwartz, Amnon Shashua, the contents of which are incorporated herein by reference in their entirety.

RELATED APPLICATION

This application claims the benefit of priority under 35 U.S.C. § 119(e) of U.S. Provisional Patent Application No. 62/366,658 filed on Jul. 26, 2016. The contents of the above application are all incorporated by reference as if fully set forth herein in their entirety.

FIELD AND BACKGROUND OF THE INVENTION

The present invention, in some embodiments thereof, relates to categorizing a video stream, and, more specifically, but not exclusively, to semantically categorizing a video stream content through multimodal content analysis and classification.

Efficient content organization of digital media in general and of video data in particular may be an essential key for allowing a plurality of applications, such as for example, content search, video stream monitoring for inappropriate content, content targeting, media management, media streaming and/or advertisement to take full advantage of the organized video data. The digital media content organization may be based on content semantic categorization of the digital media to extract the most important semantic properties of the video stream (i.e. what the video stream is all about).

SUMMARY OF THE INVENTION

According to some embodiments of the present invention there is provided a computer implemented method of semantically categorizing a video stream through multimodal content classification, comprising:
  Dividing a designated video stream to a plurality of scenes by analyzing a visual content of a plurality of frames of the video stream in to identify scene changes between consecutive scenes of the plurality of scenes.
  Applying a plurality of classification functions to each of a plurality of modalities extracted from each of the plurality of scenes to calculate a class probability for each of a plurality of known concepts detected in each scene.
  Applying a plurality of multimodal classification functions on the class probability of the plurality of known concepts to calculate a scene category probability for each scene indicating a probability of the scene to be categorized in one or more of a plurality of semantic categories.
  Categorizing the video stream to a stream category of the plurality of semantic categories by aggregating the scene category probability of the plurality of scenes.

Optionally, a video classification data record is outputted and/or provided that comprises one or more of the class probability for each of the plurality of known concepts in for each scene, the scene category probability for each scene and/or the stream category.

The plurality of modalities comprises visual, audio, textual and/or motion.

Each of the plurality of known concepts refers to a generalization of a recognizable entity in the plurality of modalities.

Each of the plurality of known concepts may be a visual concept, an audio concept, a textual concept and/or a motion concept.

Each of the plurality of classification functions is trained offline to classify one or more of the plurality of known concepts.

Each of the plurality of multimodal classification functions may be a single label multimodal classification function or a multi-label multimodal classification function.

Each of the plurality of multimodal classification functions is trained offline to classify one or more scene of a video stream. Each of the plurality of multimodal classification functions is a trained using sets of the class probability for each of the plurality of known concepts present in a plurality of respective training samples.

The class probability includes one or more of a plurality of concept probability distribution values each indicating a classification probability score for an associated one of the plurality of known concepts being present in the scene.

The class probability includes a binary decision value indicating a class of the each known concept. The binary decision value is calculated by comparing each of the plurality of probability distribution values to a respective predefined class threshold value.

The scene category probability includes one or more of a plurality of scene probability distribution values each indicating a category probability for each scene being categorized in one of the plurality of semantic categories.

The scene category probability includes a binary decision value indicating a category of each scene. The binary decision value is calculated by comparing each of the plurality of scene probability distribution values to a predefined category threshold value.

Optionally, at least some selected frames are extracted from the video stream. The selected frames are used for the categorization of the video stream.

According to some embodiments of the present invention there is provided a system for semantically categorizing a video stream through multimodal content classification, comprising an interface module for designating a video stream, a program store storing a code and one or more processor coupled to the interface and the program store for executing the stored code, the code comprising:
  Code instructions to divide the video stream to a plurality of scenes by analyzing a visual content of a plurality of frames of the video stream to identify scene changes between consecutive scenes.
  Code instructions to apply a plurality of classification functions to each of a plurality of modalities extracted from each of the plurality of scenes to calculate a class probability for each of a plurality of known concepts detected in each scene.

Code instructions to apply a plurality of multimodal classification functions on the class probability of the plurality of known concepts to calculate a scene category probability for the each scene indicating a probability of the scene to be categorized in one or more of a plurality of semantic categories.

Code instructions to categorize the video stream to a stream category of the plurality of semantic categories by aggregating the scene category probability of the plurality of scenes.

Optionally, the code comprises code instructions to output a video classification data record comprising one or more of the class probability for each of the plurality of known concepts for the each scene, the scene category probability for the each scene and/or the stream category.

Optionally, the code comprises code instructions to extract at least some selected frames from the video stream. The selected frames are used for the categorization of the video stream.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to categorizing a video stream, and, more specifically, but not exclusively, to semantically categorizing a video stream content through multimodal content analysis and classification.

According to some embodiments of the present invention, there are provided methods and systems for a staged classification approach for semantically categorizing a content of a video stream. The staged classification approach comprises of two stages, first analyzing data of one or more modalities extracted from the video stream to classify multimodal concepts and categorizing semantically (contextually) the video stream to a high-level semantic category based on the multimodal concepts classification. The video stream content semantic categorization aims to extract the most important semantic properties of the video stream (i.e. what the video stream is all about) and create a video stream categorization record indicating the detected semantic properties.

The staged classification approach is applied by first dividing the video stream to one or more scenes and extracting data of one or more modalities, for example, visual data, motion data, audio data and/or textual data from each of the scenes. In the first stage of the staged classification a plurality of classifiers (classification functions) each directed to one of the modalities are applied to calculate a presence probability (classify) one or more low-level concepts, for example, visual concepts, motion concepts, audio concepts and/or text concepts in the respective modality data.

The term concept relates to a generalization of a recognizable entity in one or more of the modalities. The recognizable entity may be, for example, an object, an entity, an environment, a location, a points-of-interest, an event, an action, a movement, a sound, a face expression, a text and/or the like. The concept may be associated with one or more characteristics; for example, a visual concept may be a visual object having one or more characteristics, for example, an appearance, a location, an extent (i.e. a bounding space) and/or the like. As another example, an audio concept may be a song having one or more characteristics, for example, a tune, lyrics and/or the like.

In the second stage of the staged classification approach, based on the recognized (classified) low-level concepts, a category probability is calculated for each of the scenes to categorize semantically (contextually) each scene to one or more high-level semantic categories, for example, a football game, a news broadcast, a romantic scene, a life musical show and/or the like. The semantic categorization of the scenes to the high-level semantic categories may be done by applying a plurality of trained classification functions that provide category probabilities (rankings) for each of the scenes with respect to the plurality of high-level semantic categories. The semantic categorization of the entire video stream to the high-level semantic categories is based on a cross-scene aggregation of the category probabilities of each of the scenes that produces category probabilities (rankings) for the entire video stream.

The categorization data of the video stream, the scenes and/or the classification data of the low-level concepts may be provided, for example, encapsulated and/or embedded in a metadata record of the video stream.

The staged classification approach employs several methods and techniques for accurately categorizing semantically the video stream content for media search, media monitoring and/or media targeting applications. The staged classification approach may present significant advantages over currently existing methods for video classification such as, for example, surveillance systems and/or object detection systems. These systems may be directed to either detect moving objects in a small set of locations (i.e. the camera is located in some constant place) or tracking a small set of predefined objects. The currently existing video classification methods may also tag frames in the video stream that contain one of the predefined set of objects such as, for example, faces, cars, pedestrians etc.

The currently existing video classification methods may be directed towards detecting low-level objects in the video stream. Accurately classifying the low-level object in the video stream may require extensive processing resources and/or processing time. The staged classification approach on the other hand, applies classification functions trained to calculate high-level category probabilities for the video stream scenes based on the existence probabilities of the plurality of low-level concepts (a large set of concepts). The requirements on the accuracy and/or precision of the existence probabilities for each the plurality of low-level concepts may therefore be reduced since the high-level categorization relies on the aggregated existence probabilities of all the low-level concepts thus compensating for the reduced accuracy. Reducing the accuracy and/or precision may significantly reduce the processing resources and/or processing time required to classify the low-level concepts and hence the overall video stream semantic categorization. The staged classification approach may utilize machine-learning algorithms (classifiers) that may require much simpler training sessions and/or much smaller quantities of training samples compared to concurrently classifying all low-level objects (of all modalities) at the same time as may be done by the currently existing methods. In the staged classification approach, the low-level concepts may be considered as attributes to simplify the classification process.

For example, using the currently existing methods, in order to train a visual classifier(s) (classification function(s)) to recognize (detect) a football match may requires a very large set of samples associated with the label "football match". However, using the staged classification approach, the classifier(s) (classification function(s)) may be trained with a small set of samples to recognize the low-level concepts (attributes), for example, a "football", a "crowd", a "goal", a "referee whistle blow", a "score board" and/or a "stadium". The high-level categorization of the scene/video stream as a football match is then done by aggregating the recognized low-level concepts. Training the classification functions to recognize the low-level concepts may require much less samples and as result significantly reduce processing resources and/or processing time. Moreover, by detecting only the most prominent low-level concepts in each of the scenes and/or the extracted modalities data and concentrating on the contextual essence of the scenes, processing of irrelevant low-level concepts may be avoided thus further reducing processing resources and/or processing time.

Further detailed description of the semantic training and categorization is provided in the publication "On the Sample Complexity of End-to-end Training vs. Semantic Abstraction Training" by Shai Shalev-Shwartz, Amnon Shashua, the contents of which are incorporated herein by reference in their entirety.

Dividing the video stream into scenes as is done by the staged classification approach may allow scene-centric video processing that may provide partitioning of the video stream into meaningful "single-minded" parts appropriate for high-level classification and/or categorization. Analyzing the video stream on scene basis may allow enhanced comprehension of the overall video stream content compared to frame-by-frame analysis that may prevent grasping the entire context of the video stream.

Taking advantage of all modalities, for example, visual, motion, audio and/or text may significantly increase the classification precision and may further enable detection of high-level categories. Such precision may not be supported by the currently existing video classification methods that may typically rely on a single modality, for example, the visual content or the audio content. Analyzing the various modalities extracted from the video stream and classifying detected objects in them may allow a wider contextual understanding of the video stream. Some events may not be detected by analyzing data of a single modality. For example, a video stream depicting a "singing" event may include both an audio concept, for example, a song and a visual concept, for example, a man with a microphone on a stage. Using only one of the concepts as may be done by the currently existing methods may lead to wrong categorization of the video stream.

For example, the video stream may be erroneously categorized as a singing event while the detected "song" in the audio data may be played by a radio in the background. As another example, the video stream may be erroneously categorized as a singing event while the detected man with a microphone on a stage in the visual data may be a stand-up comedian. However, combing the detected concepts from both the visual and the audio data, as done by the staged classification approach, may significantly improve the precision of the video stream categorization. Moreover, by analyzing all available modalities a specific concept may be more accurately recognized while possibly reducing the precision of detection of each modality since the aggregation of the various modalities may compensate for the reduced precision.

For example, a currently existing method may use only visual data to recognize a car. In order to achieve high recognition accuracy, a large set of samples of a "car" may be required for training the classifiers to recognize the car. However, by aggregating several concepts of different modalities, for example, an image of a car, a sound of a car engine and/or a text word indicating a car, the accuracy of the car recognition may be improved while the classification functions for each of the modalities may present lower precision. This may further reduce the required processing resources and/or processing time.

The staged classification approach in which the existence probability of each of the plurality of concepts (of the various modalities) are first calculated (classified) and then based on the concepts' classification the video stream scenes are categorized, allows for easier identification of the high-level categories of the scenes and hence the video stream.

The presented video stream classification methods and systems may present additional advantages, for example, avoid camera calibration, reduce and/or eliminate need for assumptions on the video stream source. Moreover, the present video stream classification methods may not require predefined set(s) of objects, environments, actions and/or other objects since they are based on probabilities analysis for a large set of different types of multimodal objects as attributes defining the main theme of the scene and/or the video stream.

Furthermore, since the video stream classification takes advantage of data extracted from all the modalities of the video stream it is possible to classify a category of each of the scenes and/or of the entire video stream even when partial modality data is available and/or objects of only part of the modalities are detected.

For example, the high-level category may be identified even when no objects of one or more modalities are detected at all in the scenes as long as existence probabilities of concepts of at least one modality can be calculated.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
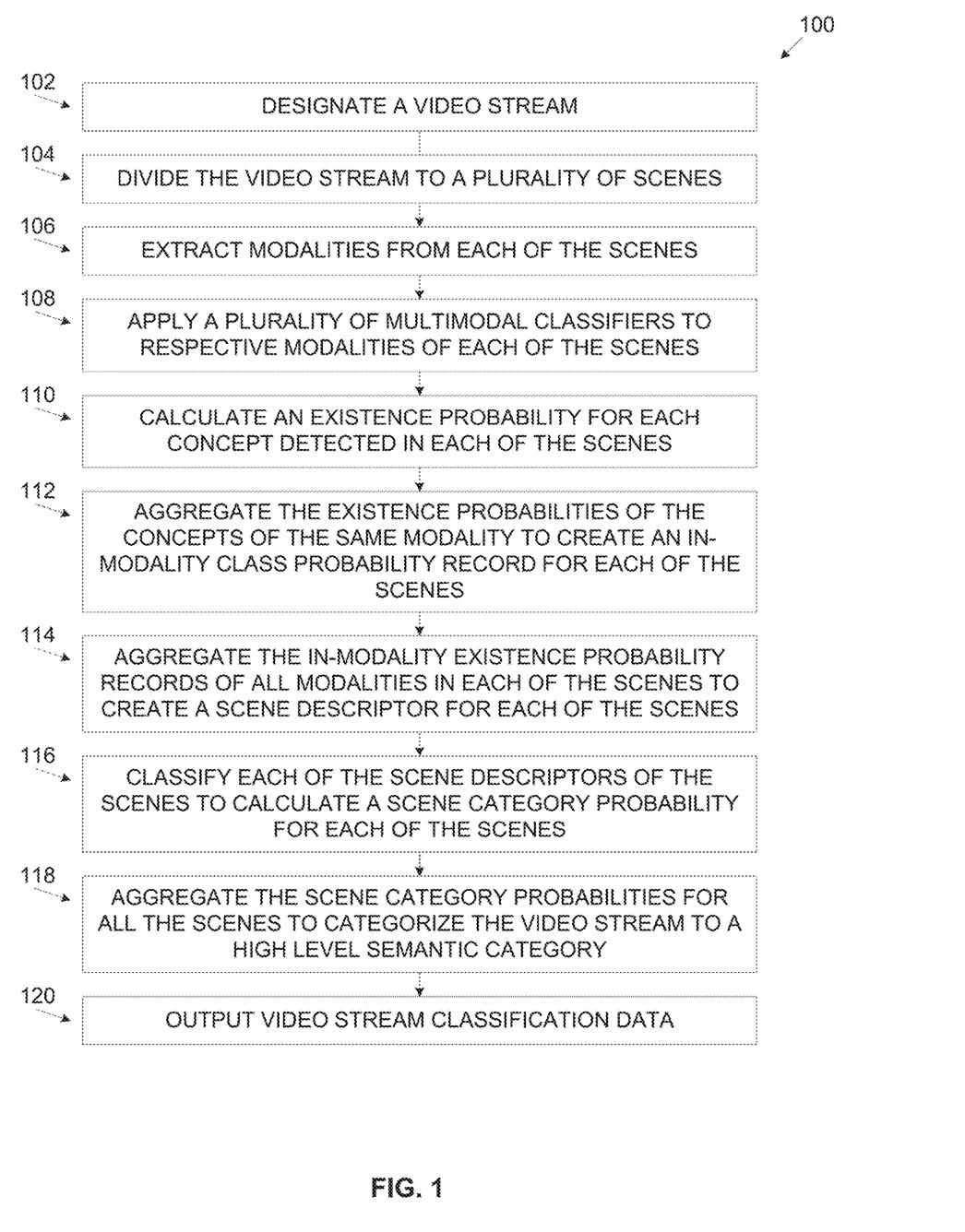
FIG. 1 is a flowchart of an exemplary process for contextually classifying a video stream through multimodal content analysis, according to some embodiments of the present invention.

Reference is now made to FIG. 1, which is a flowchart of an exemplary process for contextually classifying a video stream through multimodal content analysis, according to some embodiments of the present invention. A process 100 is executed for contextually classifying a video stream through a staged classification approach by first calculating an existence probability (classifying) low-level concepts of one or more modalities, for example, visual, motion, audio and/or textual in each of a plurality of scenes detected in the video stream. Based on the detected low-level objects, each of the scenes is categorized semantically to one or more high-level categories, for example, a football game, a news broadcast, a romantic scene, a life musical show and/or the like. The entire video stream is categorized semantically to the high-level categories based on a cross-scene aggregation of the category probabilities of each of the scenes. Classification of the low-level concepts as well as categorizing the scenes to the high-level categories may be done by employing a plurality of trained classification functions each adapted for a respective classification objective, for example, visual concepts classification, motion concepts classification, audio concepts classification, text concepts classification and/or categories classification.

Figure 2:
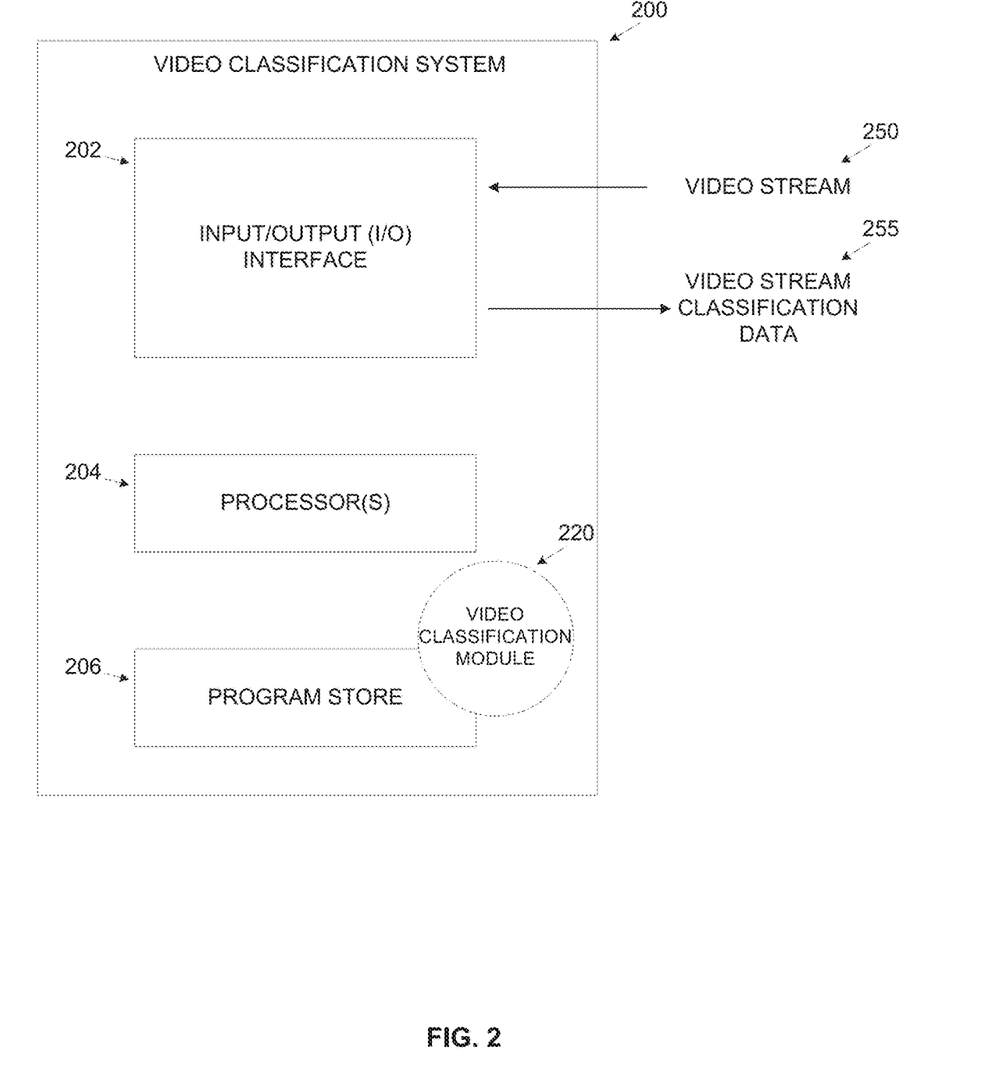
FIG. 2 is a schematic illustration of an exemplary system for contextually classifying a video stream through multimodal content analysis, according to some embodiments of the present invention.

Reference is also made to FIG. 2, which is a schematic illustration of an exemplary process for contextually classifying a video stream through multimodal content analysis, according to some embodiments of the present invention. A video classification system 200 includes an input/output (I/O) interface 202 for designating a video stream 250 and/or outputting video stream classification data 255, a processor(s) 204 for executing a process such as the process 100, a program store 206 for storing code and an output interface for providing video stream classification data 255. The video stream 250 may be for example, a video stream, an H.264 stream, an MPEG stream, a motion JPEG stream and/or the like. The I/O interface 202 may include one or more interfaces, for example, communication and/or network interfaces for receiving, fetching and/or retrieving the video stream 250 from one or more sources, for example, a storage device such as the program store 206, a network node and/or an attachable device such as, for example, an attachable storage device.

The processor(s) 204, homogenous or heterogeneous, may include one or more processing nodes arranged for parallel processing, as clusters and/or as one or more multi core processor(s).

The program store 206 may include one or more non-transitory, non-volatile devices, for example, a hard drive, a solid-state drive, a Flash array and the like. The program store 206 may be used for storing one or more software modules such as, for example, a video classification module 220 for classifying a video stream such as the video stream 250 based on a multimodal content analysis of the video stream 250 and generating the video stream classification data 255. The software classification module 220 may include one or more software modules wherein a software module refers to a plurality of program instructions stored in a non-transitory medium such as the program store 206 and executed by a processor such as the processor(s) 204. The program store 206 may further comprise one or more network storage devices, for example, a storage server, a network accessible storage (NAS) a network drive, and/or the like that are accessible through the input interface. The program store 204 may be for storing the video stream 250 and/or the video stream classification data 255.

Optionally, the video classification system 200 is implemented as a cloud service for example, a software as a service (SaaS), a platform as a service (PaaS) and/or the like capable of designating the video stream 250 and classifying it to generate the video stream classification data 255.

As shown at 102, the process 100 starts with the video classification module 220 designating the video stream 250. The video classification module 220 may retrieve and/or receive the video stream 250 from a local and/or network device through the I/O interface 202. Optionally, the video classification module 220 extracts selected frames from the video stream 250 to be used later on for the classification analyses. In such case, the selected frames are designated the video stream 250. For example, I-Frames (IF) may be extracted from the video stream 250 in case the video stream 250 is a compressed video stream such as, for example, MPEG-2 and/or H.264. This may be useful to avoid processing P-Frames and/or B-Frames of the compressed frames stream 250 that may be partial and/o dependent on the I-Frames and may therefore be less effective for providing additional substantial visual and/or motion data to what may be available from the I-Frames.

The video classification module 220 may extract one or more additional frames from the video stream 250, for example, every predefined time period in order to avoid loss of visual/motion data and/or to maintain track of one or more concepts in the video stream 250.

As shown at 104, the video classification module 220 divides the video stream 250 to one or more scenes by analyzing the content of consecutive frames in the video stream 250 and identifying scene changes. Further detailed description of detecting scene changes to divide the video stream 250 to scene(s) is provided in U.S. Provisional Patent Application No. 62/310,885 entitled "Scene Change Detection And Logging", the contents of which are incorporated herein by reference in their entirety.

As shown at 106, the video classification module 220 extracts one or more modalities' data, for example, visual data, motion data, audio data and/or textual data from each of the scenes detected in the video stream 250.

Figure 3:
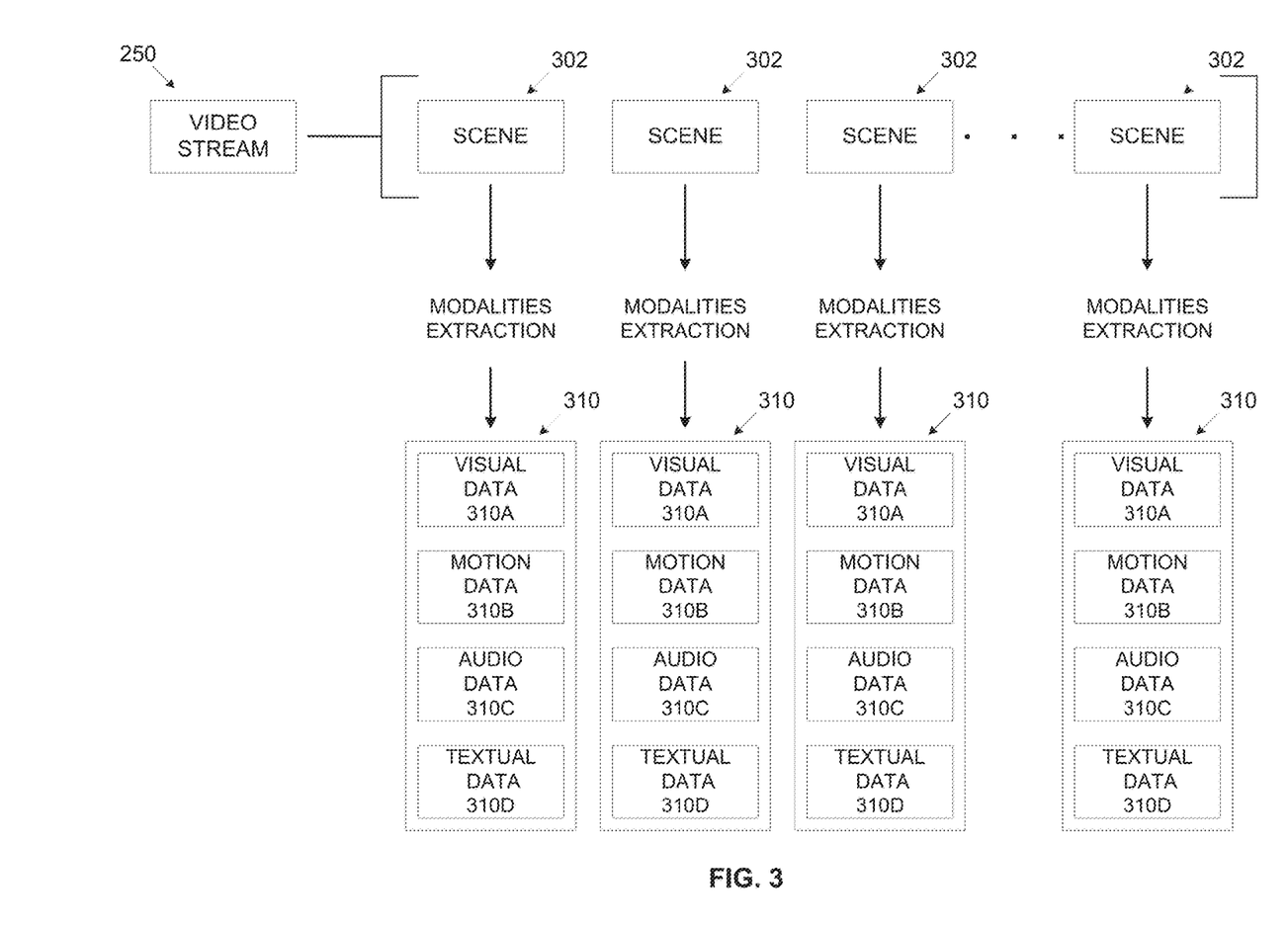
FIG. 3 is a schematic illustration of an exemplary modalities extraction from a plurality of scenes detected in a video stream, according to some embodiments of the present invention.

Reference is now made to FIG. 3, which is a schematic illustration of an exemplary modalities extraction from a plurality of scenes detected in a video stream, according to some embodiments of the present invention. A video classification module such as the video classification module 220 extracts modalities data 310 from each scene 302 of a video stream such as the video stream 250. The modalities data 310 relating to a respective scene 302 may include, for example, visual data 310A, motion data 310B, audio data 310C and/or textual data 310D. The visual data 310A may include, for example, frames associated with each scene 302. The video classification module 220 may extract the motion data 310B using one or more mechanisms and/or engines, for example, an optical flow analysis engine, a motion prediction engine and/or motion detection engine. The motion pattern(s) may be presented in the form of a motion map where for a set of predefined locations detected in one or more frames of the respective scene 302 the motion in each of these locations is calculated as a two dimensional vector—motion in direction X (horizontal) and motion in direction Y (vertical).

The motion map for every pair of frames may therefore consist of two arrays, one containing the motion values in the direction X and the second containing motion values in the direction Y. The audio data 310C may include, for example, a sound track, an audio stream and/or audio effects associated and/or intersecting with a respective scene 302.

The textual data 310D may include, for example, subtitles data associated with the scene 302. The textual data 310D may also include speech information associated with the respective scene 302 obtained through one or more speech-to-text engines. In addition, the textual data 310D may include text visually presented in one or more frames in the respective scene 302 obtained through one or more optical character recognition (OCR) engines. The textual data may further include global information of the video stream 250, for example, a title of the video stream 250, a description of the video stream 250 and/or the like. Optionally, the video classification module 220 extracts textual data from one or more metadata record(s) embedded, encoded, encapsulated and/or associated with the respective scene 302 and/or the video stream 250.

Reference is made once again to FIG. 1. As shown at 108, the video classification module 220 applies one or more of a plurality of classifiers (classification functions) over the extracted modalities data such as the modalities data 310 to calculate an existence probability (classify) for one or more of a plurality of concepts in each of the scenes such as the scenes 302. The classifiers may employ one or more probabilistic models, engines and/or algorithms, for example, a support vector machine (SVM), a neural network, a decision tree, a K-Nearest neighbors algorithm and/or any other learning algorithm. The classifiers are each directed to a respective modality and may be adapted to classify the concepts of the respective modality, for example, visual classifiers, motion classifiers, audio classifiers and/or textual classifiers. The visual concepts may include, for example, an entity, an object, a logo, a symbol, a face, a location, scenery, a landscape and/or the like.

The motion concepts may include, for example, the motion patterns that may be associated with actions such as, for example, moving, walking, running, flying and/or the like that may be expressed, for example, as the motion map. The audio concepts may include, for example, a typical sound pattern, a music tune and/or a song, an intonation of speech and/or the like. The typical sound pattern may be, for example, an audience applaud, a driving car, an explosion, dog bark, a tennis ball hit and/or the like. The intonation of speech may be, for example, a tender intonation, an aggressive intonation, a casual intonation and/or the like. The text concepts may include vocabulary expressed as, for example, a single word, a sentence and/or a bag of words.

Figure 4:
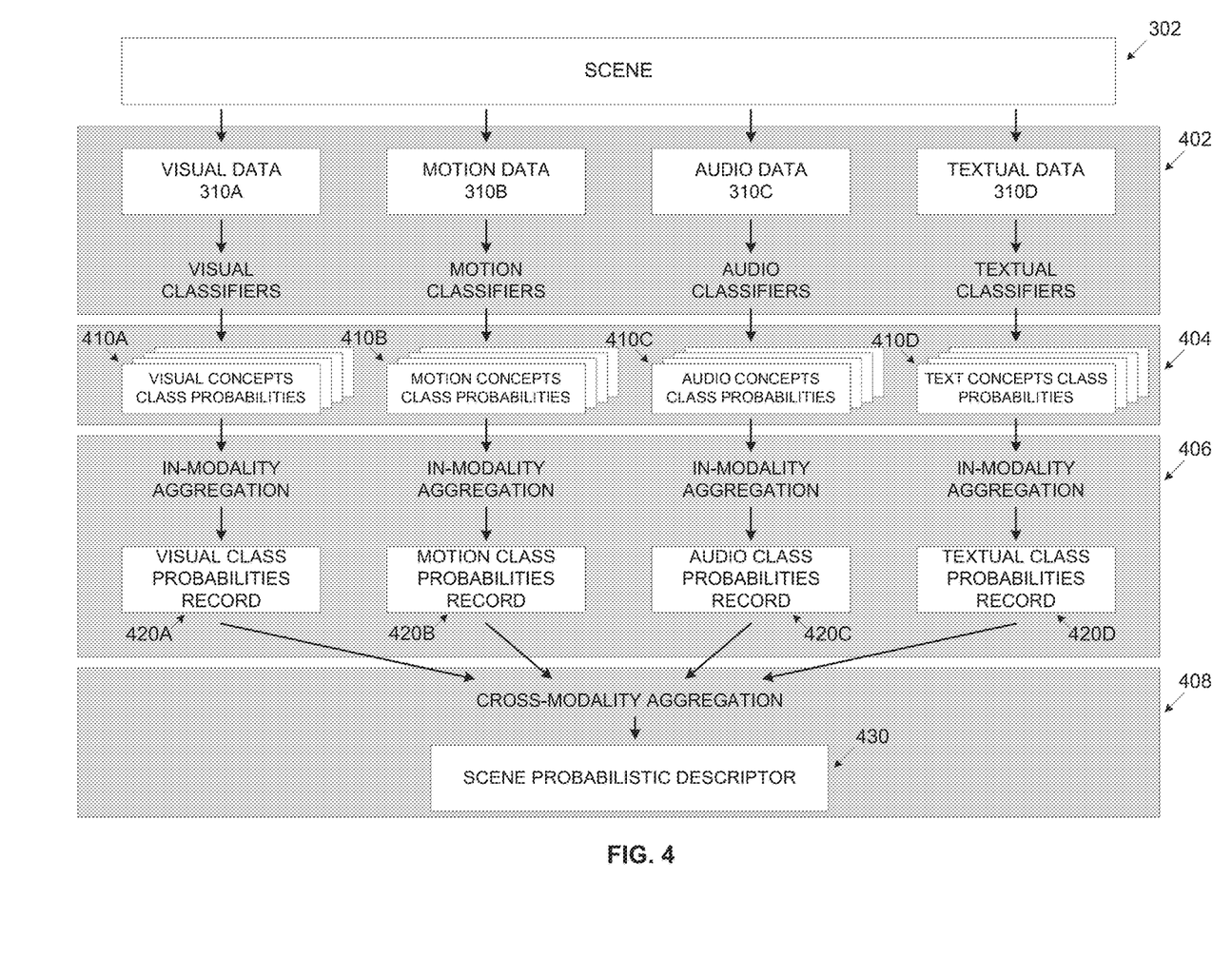
FIG. 4 is a flowchart of an exemplary process for a scene category probability for a scene of a video stream, according to some embodiments of the present invention.

Reference is now made to FIG. 4, which is a flowchart of an exemplary process for calculating a scene category probability for a scene of a video stream, according to some embodiments of the present invention. As shown at 402, a video classification module such as the video classification module 220 applies a plurality of classifiers on modalities data such as the modalities data 310 extracted from each scene such as the scenes 302 of a video stream such as the video stream 250.

The classifiers are applied to the respective extracted modalities data 310, for example, visual classifiers are applied to visual data such as the visual data 310A, motion classifiers are applied to motion data such as the motion data 310B, audio classifiers are applied to audio data such as the audio data 310C and/or textual classifiers are applied to textual data such as the textual data 310D.

The visual and/or the motion classifiers may employ one or more image processing tools as known in the art and/or yet to be known to detect visual concepts in the sample data 310A and/or 310B. The audio classifiers may employ one or more signal, sound and/or voice processing tools as known in the art and/or yet to be known to detect audio concepts in the sample data 310C. The textual classifiers may employ, simple vocabulary-based extraction, bag of words classification, nearest neighbor classification with distances based on text embedding and/or other natural language processing tools as known in the art and/or yet to be known.

The classifiers may be single class classifiers trained to estimate a single label (associated with a single concept) and/or multi-class classifiers trained to estimate multiple labels (associated with multiple concepts). The single class classifiers may be trained with training data samples having binary classification labels identifying a presence or absence of the respective concept while the multi-class visual classification functions may be trained with training data samples having multiple classification labels identifying a presence or absence of multiple concepts.

For example, a certain single class visual classifier may be trained to detect presence or absence of a visual concept in a respective scene 302 and associate it with a corresponding label, for example, "a car" and "not a car". A certain multi-class visual classifier on the other hand may be trained to detect multiple classification labels identifying a presence or absence of several visual concepts, for example, a car, a motorcycle, a horse and/or a television set (TV). In the same manner, an exemplary audio classifier may be trained to detect presence or absence of an audio concept in a respective scene 302 and associate it with a corresponding label, for example, "a song" and "not a song". A certain multi-class audio classifier may be trained to detect multiple classification labels identifying a presence or absence of several audio concepts, for example, a song and/or applause. In addition, one or more of the concepts, for example, a car and a truck may be associated with a single classification label, for example, a car.

Moreover, one or more of the concepts, for example, a motorcycle identified in a certain scene 302 may be associated with two or more classification labels, for example, a vehicle and a motorcycle.

The classifiers are trained offline with a plurality of training samples of respective modalities to train the classifiers to statistically estimate a presence probability of one or more concepts in each of the scenes 302. The training samples include training data for each of the modalities, for example, visual samples for the visual classifiers, motion samples for the motion classifiers, audio samples for the audio classifiers and/or textual samples for the textual classifiers.

The training process may be regarded as an optimization process in which parameters of the classifiers are tuned such as to reduce the estimation and/or prediction error for the estimation of the presence of the respective known concepts presented in the training samples. Training the classifiers aims to allow the classifiers to learn the pattern of the respective known concept(s). The training data set may be selected to include a large number of samples that portray various aspects of the concept(s), for example, multiple different items of the concept, transformations and/or the like. The visual training data may include for example, multiple items of the same visual class, for example, various cars for the class "car", multiple viewing angles of the visual concept(s), transformations (rotation, shift, translation, scaling, reflection, etc.) of the visual concept(s) and the likes.

The audio training data may include for example, multiple items of the same audio class, for example, various songs for the class "song", different performances and/or performers of the same song, transformations (speed perturbation, pitch shifting, time stretching, gain inductance, frequency warpage, noise injection, etc.) of the audio concept(s) and the likes. The training samples may include complete samples, for example, images, frames, tunes, words and/or actions. However, the classifiers may be trained with training samples that include one or more partial concept samples, for example, an image part, partial visibility of a respective visual concept(s), a partial tune, a partial motion pattern (action) and/or a partial word.

The training samples may be selected to include a large number of samples to improve the estimation capabilities of the classifiers and/or for reducing possible overfitting effects. Training the classifiers with the various aspects (variety and/or transformations) of the concept(s) may allow properly classifying the concept(s) even when the concept(s) are somewhat transformed and/or not fully presented. The training samples may include the concepts in the natural form as reflected in the respective modality data 310 and/or after some pre-processing, for example, feature extraction. An exemplary feature extraction may include, for example, a histogram of oriented gradients (HOG) feature(s) for the visual data 310A and/or mel-frequency cepstrum (MFCC) for the audio data 310C. After training, the classifiers are capable of receiving real samples of the respective modality data such as the visual data 310A, the motion data 310B, the audio data 310C and/or the textual data 310D in a similar format to the training samples.

The output of the training process is that each of the classifiers that are decision function (the probabilistic model) are able to receive an input sample (in the same format of the training sample) and return a probability value for each of their associated known labels. The higher the probability value for a specific label—the higher is the belief that the concept associated with the respective known label exists in the presented content.

Reference is made once again to FIG. 1. As shown at 110, the trained classifiers applied by the video classification module 220 calculate a probability of presence (existence) of the one or more concepts classes that each classifier is trained to recognize (classify). In other words, the trained classifiers calculate a probability for the presence of the respective concept class in the real modality data 310 based on the probabilistic models created during the training. The result is the video classification module 220 identifying one or more concepts in each of the scenes 320 and assigning the plurality of known concepts with the class probability scores indicating the probability of the presence (existence) of the associated concept(s).

Reference is made once again to FIG. 4. As shown at 404, the classifiers calculate a class probability 410 for each of the known concepts detected in the modalities data 310 such as the visual data 310A, the motion data 310B, the audio data 310C and/or the textual data 310D extracted from each scene 302. The visual classifiers calculate a class probability 410A for each of the known visual concept(s) detected in the visual data 310A, the motion classifiers calculate a class probability 410B for each of the known motion concept(s) detected in the motion data 310B, the audio classifiers calculate a class probability 410C for each of the known audio concept(s) detected in the audio data 310C and the textual classifiers calculate a class probability 410D for each of the known text concept(s) detected in the audio data 310D.

The calculated class probability may include a class probability score record that may be a vector of class probability distributions of real valued scores. The vector of class probability distributions may be interpreted as probability of a respective concept to be present (exist) in the presented content, e.g. the modalities data 310. I.e. for the respective concept, each of the score values is calculated by a respective classifier used to classify the respective concept and indicates the probability of the respective concept be present (exist) in the presented content, e.g. the modalities data 310. The class probability scores may be in the form of a probability value, for example, in a range of 0 to 1 and/or the calculated probability score may be transformed to a probability, for example, through a Platt scaling process. In addition, the class probability may include a binary decision value that associates the concept with a specific class label. The binary decision value may be assigned by, for example, comparing all the calculated class probability values to a predefined class threshold value and associating the respective concept(s) with the label for which the class probability value exceeds the predefined class threshold value. As another example, the binary decision value may be assigned by comparing all the calculated class probability values to each other and associating the respective concept(s) with the label for which the class probabilities score is highest.

The visual classifiers may classify and calculate the visual class probability 410A for one or more visual concepts, for example, an entity, an object, a logo, a symbol, a face, a landscape, scenery, a location, an overall frame environment and/or the like. For certain detected and/or classified concepts, for example, people, the visual classifiers may further classify, for example, age, gender, expression, known celebrity and/or the like. The visual classification may be applied to entire frames in the visual data 310A and/or to a limited number of large sub-frame windows of the frame(s) such that only the most prominent visual concepts are detected and considered later on for categorizing the scene 302.

The motion classifier(s) may classify and calculate the motion class probability 410B for one or more known motion concepts (based on the motion maps) associated with one or more detected visual concepts. The motion classifier(s) may identify one or more of the motion patterns indicating an existence of one or more of known sets of actions or events, for example, a running person, a flying plain and/or a driving car.

The audio classifier(s) may classify and calculate the audio class probability 410C for one or more known audio concepts, such as, for example, a song, an applause, etc. The audio classifiers may further classify an overall audio stream mood, for example, romantic, melancholy, cheerful and/or the like.

The textual classifier(s) may classify and calculate the text class probability 410D for one or more known text concepts.

At the end of this stage, the video classification module 220 holds a score record, for example, a score vector for each concept extracted from each of the scenes 302. Each of the score vectors holds the class probability distributions for the respective concept of the respective modality identified in the scene 302. Some of the modalities may produce several score vectors for a single concept. For example, a score vector may be calculated and assigned to a respective visual concept detected in each of several frames extracted from the scene 302. As another example, a first score vector may be calculated and assigned to one or more text concepts extracted from the scene 302 through OCR tools while a second score vector may be calculated and assigned to one or more text objects extracted from the scene 302 using speech-to-text tools.

Reference is made once again to FIG. 1. As shown at 112, the video classification module 220 aggregates the score vectors within each of the modalities of each of the scenes 302 to create an in-modality class probability record, for example, a vector for the scene 302. The video classification module 220 repeats the aggregation for all scenes 302 in the video stream 250. The aggregation aims to aggregate the one or more score vectors of a certain dimensionality to one in-modality class probability vector of the same dimensionality. The aggregation may include, for example, performing simple and/or weighted summing of the class probability distributions (real valued scores) included in the score vectors within each modality of the scene 302 followed by normalization of the summed score vectors. Other methods and/or implementations of the aggregation may be used.

Reference is made once again to FIG. 4. As shown at 406, the class probabilities of all the known concept(s) relating to each of the modalities are aggregated within each of the modalities to create an in-modality class probabilities record 420, for example, a vector. The visual concepts class probabilities 410A of all the visual concept(s) are aggregated to create the visual class probabilities vector 420A. The motion concepts class probabilities 410B of all the motion concept(s) are aggregated to create the motion class probabilities vector 420B. The audio concepts class probabilities 410C of all the audio concept(s) are aggregated to create the audio class probabilities vector 420C. The text concepts class probabilities 410D of all the text concept(s) are aggregated to create the text class probabilities vector 420D. In case a single concept (of any of the modalities) is assigned with two or more class probabilities vectors 410, the two or more class probabilities vectors 410 are first aggregated to create a single class probabilities vector 410 for the concept. After all concepts are associated with a single class probabilities vectors 410 all the respective class probabilities vectors 410 are aggregated together to create the overall in-modality class probabilities vector 420.

Reference is made once again to FIG. 1. As shown at 114, the video classification module 220 aggregates the in-modality class probabilities vectors 420 across all the modalities extracted from the scene 302 to create a multi-modal probabilistic scene descriptor $D^S$, where D is the descriptor and S is the number of dimensions of the descriptor. The scene descriptor $D^S$ is a real valued vector with the number of dimensions equal to the number of recognized class concepts from all the modalities extracted from the scene 302, for example, visual, motion, audio and/or text.

The aggregation of the in-modality probabilities vectors (each per a different modality) to create the scene descriptor $D^S$ may be done by concatenation. In case an concept is recognized (classified) in, for example, two modalities, two different dimensions are assigned to represent the recognized concept. For example, a car may be recognized and classified by one or more of the visual classifiers as well as by one or more of the textual classifiers.

Reference is made once again to FIG. 4. As shown at 408, the in-modality probabilities vector 420 of all the modalities extracted from the scene 302 are aggregated to create a scene descriptor 430 such as the scene descriptor $D^S$ for the scene 302 (repeated for all the scenes 302 of the video stream 250).

Reference is made once again to FIG. 1. As shown at 116, the video classification module 220 calculates a scene category probability for each of the scene descriptors $D^S$ 430 to categorize the scene to one or more of a plurality of high-level semantic (contextual) categories, for example, a football game, an action movie, a cello concert and/or the like. The goal of the classification is to calculate a categories probability for each of the scenes 302 based on the classes of the concepts recognized in the scene 302, i.e. based on the content of the scene 302.

Figure 5:
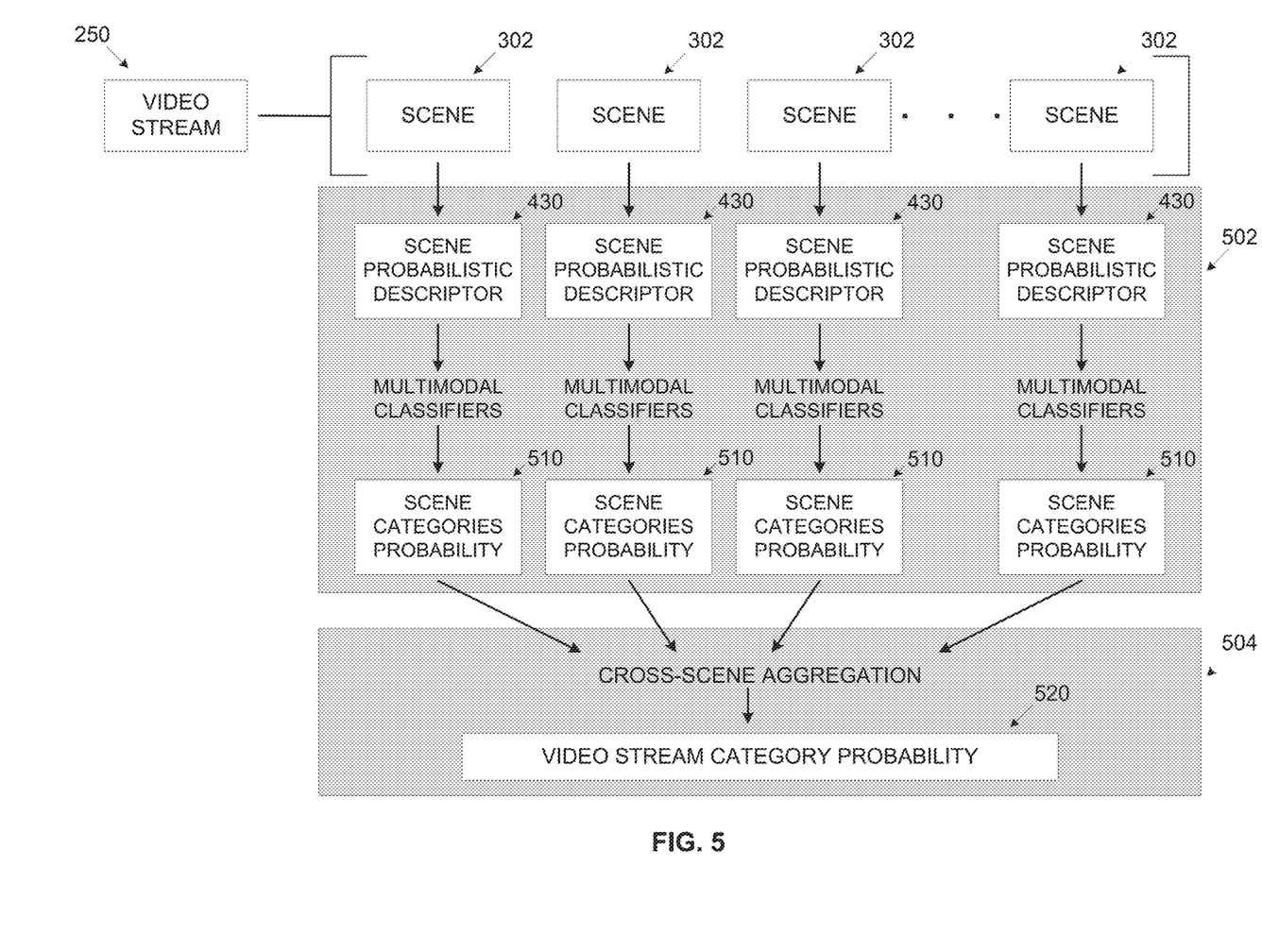
FIG. 5 is a flowchart of an exemplary process for contextually categorizing a video stream to a high-level semantic category by scenes categorization and cross-scene aggregation, according to some embodiments of the present invention.

Reference is now made to FIG. 5, which is a flowchart of an exemplary process for contextually categorizing a video steam to a known high-level semantic category by scenes categorization and cross-scene aggregation, according to some embodiments of the present invention. As shown at 502, the video classification module 220 may apply one or more high-level multimodal classifiers to categorize semantically each of the scenes 302 to the known high-level contextual categories.

The multimodal classifiers are applied to each of the scene descriptor $D^S$ 430 to calculate a scene categories probability 510, for example, a ranking for each of the scenes 302. The categories probability 510 may be, for example, a vector comprising a scene category probability distribution of real valued scores interpreted as the probability of the scene 302 to be of a contextual category associated (labeled) with the respective multimodal classifier. The scene categories probability 510 may include a binary decision value that associates the scene 302 with a most probable specific one of the contextual categories. The binary decision value may be set by comparing the plurality of the real valued scores to a predefined category threshold value. Additionally and/or alternatively, the binary decision value may be acquired by comparing all the real valued scores to each other and selecting the category presenting the highest score. The resulting scene categories probability 510 defines the ranking of the high-level contextual categories scene categories relevancy for each of the scenes 302 where the highest scoring category is the most relevant.

The multimodal classifier(s) may be trained in a similar way the single modality classifiers such as the visual classifier(s), the motion classifier(s), the audio classifiers and/or the textual classifiers are trained. The training samples used during the training are the scene descriptors $D^S$ 430 created for each of the plurality of scenes 302 during step 114. For example, a specific multimodal classifier associated with a semantic high-level category (class) "football match" may be trained with scene examples depicting a football match(s) used as positive examples and scene examples that do not depict a football match (for example, a soccer match, a golf match, a wedding and/or the like) used as negative examples.

Obviously, the multimodal classifier(s) relies on the probability values (in the scene descriptors $D^S$ 430) calculated for the low-level concepts by the respective modality classifiers. For example, "stadium", "football field", "ball" (football), "scores board" and/or "crowd" classified by the visual classifier(s) applied to the visual data 310A, "visitors" classified by the text classifier(s) applied to the text data 310D (extracted for example through OCR from the visual data 310A) and/or "referee whistle sound" and "cheering crowd" classified by the audio classifier(s) applied to the audio data 310C.

Reference is made once again to FIG. 1. As shown at 118, the video classification module 220 aggregates the scene categories probability 510 to calculate a video stream categories probability for the video stream 250.

Reference is made once again to FIG. 5. As shown at 504, the scene categories probability 510 of all of the scenes 302 are aggregated to create a video stream categories probability 520 for the video stream 250. The video stream categories probability 520 may be in the form of, for example, a vector $R^V$. The number of dimensions V in the vector $R^V$ is equal to the number of known high-level contextual categories and the vector $R^V$ may include a probability distribution of real valued scores interpreted as the probability of the video stream 250 to be of a respective known contextual category. The video stream categories probability 520 may include a binary decision value that associates the video stream 250 with a most probable specific one of the contextual categories. The binary decision value may be set by comparing the plurality of the real valued scores to a predefined category threshold value. Additionally and/or alternatively, the binary decision value may be acquired by comparing all the real valued scores to each other and selecting the category presenting the highest score.

The resulting video stream probability 520 defines the ranking of the high-level contextual categories scene categories relevancy for each of the scenes 302 where the highest scoring category is the most relevant.

The video classification module 220 may aggregate the scene categories probability 510 of all of the scenes 302, for example, by first summing the scene categories ranking vectors for all the scenes 302 of the video stream 250 using a simple sum and/or a weighted sum. The video classification module 220 may then normalize the summed ranking vector to create the video stream probability 520, for example, the video stream ranking $R^V$.

Additionally and/or alternatively, other aggregation methods may be applied to aggregate the real valued vectors available in the scene categories probability 510 of the scenes 302 to create the video stream categories probability vector of the same dimensionality.

Reference is made once again to FIG. 1. As shown at 120, the video classification module 220 creates a record comprising the video classification data 255 for the video stream 250. The video classification data 255 may be constructed as a structured textual representation comprising, for example, the high-level categories identified for the video stream 250, the high-level categories identified for one or more scenes 302 and/or one or more of the recognized concepts. The structured textual representation may be arranged to include, for example:

An ordered list of k most relevant high-level categories with their score values.

A set of scenes 302 with starting and ending time of each scene 302.

For each scene:
An ordered list of k most relevant high-level categories with their score values.
A set of recognized (classified) concepts with their score values and time of appearance.

The structured textual representation may be created as presented in an exemplary pseudo-code excerpt 1 presented below.

```
Pseudo-code Excerpt 1:
  <Content Name> {
    categories {
      <category name> : <category score>
      ....
    }
    scenes {
      <scene id> {
        time : [<start>,<end>]
        categories : {
          <category name> : <category score>
          ....
        }
        concepts : {
          name : <object name>
          type : <object type>
          score : <object score>
        }
      }
      ....
```

Optionally, the video classification module 220 encapsulates and/or embeds the video classification data 255 in the metadata of the video stream 250.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of semantically categorizing a video stream through multimodal content classification, comprising:
   dividing a designated video stream to a plurality of scenes by analyzing a visual content of a plurality of frames of said video stream to identify scene changes between consecutive scenes of said plurality of scenes;
   applying a plurality of classification functions to each of a plurality of modalities extracted from each of said plurality of scenes to calculate a class probability for each of a plurality of concepts detected in said each scene;
   applying a plurality of multimodal classification functions on said class probability of said plurality of concepts to calculate a scene category probability for said each scene indicating a probability of said each scene to be categorized in at least one of a plurality of semantic categories; and
   categorizing said video stream to a stream category of said plurality of semantic categories by aggregating said scene category probability of said plurality of scenes;
   wherein each of said plurality of modalities is a member selected from a group consisting of: visual, audio, textual and motion.

2. The computer implemented method of claim 1, wherein each of said plurality of classification functions is trained offline to classify at least one of said plurality of concepts.

3. The computer implemented method of claim 1, wherein each of said plurality of multimodal classification functions is a member selected from a group consisting of: a single label multimodal classification function and a multi-label multimodal classification function.

4. The computer implemented method of claim 1, wherein said scene category probability includes at least one of a plurality of scene probability distribution values each indicating a category probability for said each scene being categorized in one of said plurality of semantic categories.

5. The computer implemented method of claim 4, wherein said scene category probability includes a binary decision value indicating a category of said each scene, said binary decision value is calculated by comparing each of said plurality of scene probability distribution values to a predefined category threshold value.

6. The computer implemented method of claim 1, further comprising extracting at least some selected frames from said video stream, said at least some selected frames are used for said categorization of said video stream.

7. A computer implemented method of semantically categorizing a video stream through multimodal content classification, comprising:
   dividing a designated video stream to a plurality of scenes by analyzing a visual content of a plurality of frames of said video stream to identify scene changes between consecutive scenes of said plurality of scenes;
   applying a plurality of classification functions to each of a plurality of modalities extracted from each of said plurality of scenes to calculate a class probability for each of a plurality of concepts detected in said each scene;
   applying a plurality of multimodal classification functions on said class probability of said plurality of concepts to calculate a scene category probability for said each scene indicating a probability of said each scene to be categorized in at least one of a plurality of semantic categories; and
   categorizing said video stream to a stream category of said plurality of semantic categories by aggregating said scene category probability of said plurality of scenes;
   wherein each of said plurality of concepts is a member selected from a group consisting of: a visual concept, an audio concept, a textual concept and a motion concept.

8. The computer implemented method of claim 7, further comprising outputting a video classification data record comprising at least one of: said class probability for each of said plurality of concepts for said each scene, said scene category probability for said each scene and said stream category.

9. The computer implemented method of claim 7, wherein each of said plurality of concepts refers to a generalization of a recognizable entity in said plurality of modalities.

10. The computer implemented method of claim 7, wherein each of said plurality of multimodal classification functions is trained offline to classify at least one scene of a video stream, each of said plurality of multimodal classification functions is a trained using sets of said class probability for each of said plurality of concepts present in a plurality of respective training samples.

11. The computer implemented method of claim 7, wherein said class probability includes at least one of a plurality of concept probability distribution values each indicating a classification probability score for an associated one of said plurality of concepts being present in said scene.

12. The computer implemented method of claim 11, wherein said class probability includes a binary decision value indicating a class of said each concept, said binary decision value is calculated by comparing each of said plurality of probability distribution values to a respective predefined class threshold value.

13. A system for semantically categorizing a video stream through multimodal content classification, comprising:
   a memory storing a code; and
   at least one processor coupled to said memory for executing said stored code, said code comprising:
      code instructions to divide a video stream to a plurality of scenes by analyzing a visual content of a plurality of frames of said video stream to identify scene changes between consecutive scenes of said plurality of scenes;

code instructions to apply a plurality of classification functions to each of a plurality of modalities extracted from each of said plurality of scenes to calculate a class probability for each of a plurality of concepts in said each scene;

code instructions to apply a plurality of multimodal classification functions on said class probability of said plurality of concepts to calculate a scene category probability for said each scene indicating a probability of said each scene to be categorized in at least one of a plurality of semantic categories; and code instructions to categorize said video stream to a stream category of said plurality of semantic categories by aggregating said scene category probability of said plurality of scenes;

wherein each of said plurality of concepts is a member selected from a group consisting of: a visual concept, an audio concept, a textual concept and a motion concept.

14. The system of claim 13, wherein said code further comprises code instructions to output a video classification data record comprising at least one of: said class probability for each of said plurality of concepts for said each scene, said scene category probability for said each scene and said stream category.

15. The system of claim 13, wherein said code further comprises code instructions to extract at least some selected frames from said video stream, said at least some selected frames are used for said categorization of said video stream.

* * * * *